United States Patent [19]
Freeman

[11] Patent Number: 6,002,808
[45] Date of Patent: Dec. 14, 1999

[54] HAND GESTURE CONTROL SYSTEM

[75] Inventor: William T. Freeman, Acton, Mass.

[73] Assignee: Mitsubishi Electric Information Technology Center America, Inc., Cambridge, Mass.

[21] Appl. No.: 08/690,297

[22] Filed: Jul. 26, 1996

[51] Int. Cl.[6] .............................. G06K 9/36; G06K 9/62; G09G 5/08; H04N 5/225
[52] U.S. Cl. .......................... 382/288; 382/181; 382/203; 382/216; 382/286; 382/287; 345/145; 345/358; 348/77; 348/171
[58] Field of Search .................................. 382/100, 103, 382/107, 174, 288, 291, 286, 141, 216, 287, 289, 181, 190, 203, 206, 204, 218, 278, 170, 189; 348/77, 170, 171; 345/145, 358

[56] References Cited

U.S. PATENT DOCUMENTS

| | | | |
|---|---|---|---|
| 4,803,735 | 2/1989 | Nishida et al. | 382/288 |
| 4,843,568 | 6/1989 | Krueger et al. | 382/100 |
| 4,941,182 | 7/1990 | Patel | 382/141 |
| 4,949,282 | 8/1990 | Muraoka | 382/288 |
| 4,988,981 | 1/1991 | Zimmerman et al. | 345/158 |
| 5,168,531 | 12/1992 | Sipel | 382/291 |
| 5,243,418 | 9/1993 | Kuno et al. | 348/170 |
| 5,319,747 | 6/1994 | Gerrissen et al. | 345/349 |
| 5,481,622 | 1/1996 | Gerhardt et al. | 382/291 |
| 5,563,988 | 10/1996 | Maes et al. | 395/121 |
| 5,594,469 | 1/1997 | Freeman et al. | 345/158 |
| 5,670,987 | 9/1997 | Doi et al. | 345/156 |
| 5,774,591 | 6/1998 | Black et al. | 382/236 |

FOREIGN PATENT DOCUMENTS

WO 93/22762  11/1993  WIPO.

OTHER PUBLICATIONS

Ishibuchi, et al "Real Time Gesture Recognition Using 3D Prediction Model," Systems, Man, and Cybernetics, 1993 International Conference., pp. 324–328.
U.S. Ser. No. 3,801,775, Acker, filed Apr. 1974.
U.S. Ser. No. 4736437, Sacks et al., filed Apr. 1988.
Davis et al. "Gesture Recognition", University of Central Florida, Department of Computer Science, 1993.

Primary Examiner—Phuoc Tran
Assistant Examiner—Daniel G. Mariam
Attorney, Agent, or Firm—Dirk Brinkman

[57] ABSTRACT

A system is provided for rapidly recognizing hand gestures for the control of computer graphics, in which image moment calculations are utilized to determine an overall equivalent rectangle corresponding to hand position, orientation and size, with size in one embodiment correlating to the width of the hand. In a further embodiment, a hole generated through the utilization of the touching of the forefinger with the thumb provides a special trigger gesture recognized through the corresponding hole in the binary representation of the hand. In a further embodiment, image moments of images of other objects are detected for controlling or directing onscreen images.

32 Claims, 7 Drawing Sheets

HAND GESTURE CONTROL SYSTEM

FIELD OF INVENTION

This invention relates to computer graphics and, more particularly, to a hand recognition computer control system.

BACKGROUND OF THE INVENTION

It will be appreciated that the control of onscreen images in a computer environment is desirable in order to provide realtime interaction. One of the more difficult problems associated with the direction of character movement is when one seeks to optically detect hand gestures in real time. The time necessary to acquire or recognize the hand gesture, both in a cluttered environment and against a natural background, can exceed several seconds, a relatively long time for interactive applications.

During optical recognition of the hand gesture, it is oftentimes necessary to compare the digital images of the hand with a template so that a match can be made between the predetermined template and the hand gesture. In so doing, many multiplications must be performed resulting in a relatively large lag time for hand gesture recognition.

One such hand gesture recognition system is described in U.S. patent application Ser. No. 08/391,955 now U.S. Pat. No. 5,594,469 by William T.

Freeman and Craig D. Weissman, filed on Feb. 25, 1995 incorporated herein by reference. While the system described therein operates satisfactorily to uniquely determine particular hand gestures, there is nonetheless a need for a more simplified system which operates more quickly and accurately to detect hand gestures.

It is also a requirement, especially in the games industry, for an exceptionally inexpensive method for hand gesture recognition.

SUMMARY OF THE INVENTION

In order to accomplish hand gesture control in an efficient, time saving, and inexpensive manner, in the Subject System the hand is characterized by image moments which refer in the subject case to spatially weighted averages of image intensities. From these image moments can be found a corresponding rectangle which has the same set of image moments. The hand gesture is characterized through the orientation, position, length and width of the corresponding rectangle. This provides an exceptionally fast recognition system for a large variety of hand gestures without having to resort to complicated image processing.

For instance, for graphical object control in which onscreen characters are to be controlled by a participant or user, it is desirable to eliminate the necessity for a mouse or a joystick in favor a readily available item, namely one hand. The ability to be able to sense hand gestures for the control of the game eliminates the requirement for costly input apparatus. More importantly, with a joystick there are only two degrees of freedom which can be controlled; but with the hand there are multiple types of actions that can be expressed through articulation of the hand. As a result, multiple parameters such as orientation, horizontal and vertical position, and projected length and width can be sensed.

In order to provide game control or other onscreen graphical object control, in one embodiment hand gestures are sensed optically through the utilization of a camera with the image being converted into a digital representation such that the position of the image of the hand, its length and width, and its orientation are detected. This provides five different measurements of the hand gesture, namely horizontal and vertical position, projected length and width and orientation. Rather than sensing the exact 3-d configuration of the hand, it is a finding of this invention that computer control can be robustly provided through the above criteria.

In particular, the X projection and Y projection of the image are calculated along with the diagonal projection followed by the generation of image moments through a specialized calculation so as to derive a rectangle having a given position, length and width, and orientation, with the characteristics of the rectangle then providing a robust simplified means of detecting a particular hand gesture.

In one embodiment, a specialized trigger gesture, which is easily recognized, involves the providing of a circle with the thumb and the forefinger to provide a hole. This type of gesture is very easily recognized by the subject system and provides the system with a signal indicating that the user has initiated the trigger gesture.

This same hand gesture can be utilized to provide a trigger for any action which the computer is to execute, including, for instance, the firing of a gun, the initiation of a rocket blast off sequence, or in fact any other machine action.

In a further embodiment, not only are hand gestures easily detected through the utilization of the image moment calculation, additionally, body movement can be detected through the detection of the moments of the image and analysis of the five measurements derived from the equivalent rectangle. Noting that the center of the rectangle is the center of mass of the object, one can detect the center of mass and therefore its movement. In this instance, one is looking at only one component of the rectangle to provide onscreen motions of a character.

More particularly, simple position and size measurements of an object can be calculated by measuring image moments. This assumes that the object of interest, normally the hand, dominates the image and that the background is uniform or can be subtracted out. The following equations detail the weighted average that is utilized to calculate image moments. If I (x, y) is the image intensity at position x, y, then the image moments up to second order are:

$$M_{00} \sum_x \sum_y I(x, y) \quad M_{10} \sum_x \sum_y x I(x, y) \quad M_{01} \sum_x \sum_y y I(x, y) \quad (1)$$

$$M_{20} \sum_x \sum_y x^2 I(x, y) \quad M_{11} \sum_x \sum_y xy I(x, y) \quad M_{02} \sum_x \sum_y y^2 I(x, y)$$

We can find the position, $x_c$, $y_c$, orientation $\theta$, and width $l_2$ and length $l_1$, of an equivalent rectangle which has the same moments as those measured in the image [1]. Those values give a measure of the hand's position, orientation, length and width. We have:

$$x_c = \frac{M_{10}}{M_{00}} \quad y_c = \frac{M_{01}}{M_{00}} \quad (2)$$

Defining the intermediate variables $a$, $b$, and $c$, $$a = \frac{M_{20}}{M_{00}} - x_c^2 \quad b = 2\left(\frac{M_{11}}{M_{00}} - x_c y_c\right) \quad c = \frac{M_{02}}{M_{00}} - y_c^2 \quad (3)$$

we can derive, analogously to [1]:

-continued $$\theta = \frac{\arctan(b, (a-c))}{2} \quad (4)$$

and $$l_1 = \sqrt{\frac{(a+c)+\sqrt{b^2+(a-c)^2}}{2}} \quad l_2 = \sqrt{\frac{(a+c)-\sqrt{b^2+(a-c)^2}}{2}} \quad (5)$$

Note that in Equations 1–5, the measurements corresponding to these equations are based on summations over the entire image, so that they will be robust against small changes in the image. The five abstracted parameters are independent of the overall contrast of the hand against the background. The calculation of Equations 2–5 are done just once per image, not once per pixel. The integrals of Equation 1 require five multiplies and six additions per pixel, the quadratic factors in x and y being precomputed.

Note, with respect to a camera field of view including one's arm because one edge of an arm will always be off the edge of the picture, the length of the hand, $L_1$, is then coupled to the $Y_c$ position. Thus, the information provided by $L_1$ is redundant with the information provided by $Y_c$. Thus, one can use the $L_2$ measurement for such camera field of view, but not the $L_1$.

While the above has been described in terms of a generalized processor, an artificial retina chip such as described in K. Kyuma, E. Lange, J. Ohta, A. Hermanns, B. Banish, and M. Oita, Nature, Volume 372, Number 197, 1994 can be used to generate some image projections as opposed to calculating them with a general processor. These image projections can then be utilized by a microprocessor to calculate the image moments. When the artificial retina chip is coupled to a microprocessor, this provides for fast calculation of the image moments. Thus, by utilizing the two projections of the image as available from an artificial retina chip, one can calculate image moments without having to resort to the utilization of the double sums of the previous equations or resorting to microprocessor calculation of all three image projections. As a result, Equations 6–9 presented hereinafter show how 1-d integrals can be utilized in the computation of the image moments.

Let the vertical, horizontal, and diagonal projections be:

$$V(x) = \sum_y I(x, y), \quad (6)$$

$$H(y) = \sum_x I(x, y), \quad (7)$$

$$D(t) = \sum_s I\left(\frac{t-s}{\sqrt{2}}, \frac{t+s}{\sqrt{2}}\right). \quad (8)$$

and

Then the image moments can be computed from those projections by [1]:

$$M_{00} = \sum_x V(x) \quad M_{10} = \sum_x xV(x) \quad M_{01} = \sum_y yH(y) \quad (9)$$

$$M_{20} = \sum_x x^2 V(x) \quad M_{11} = \sum_t t^2 D(t) - \frac{M_{20}}{2} - \frac{M_{02}}{2} \quad M_{02} = \sum_y y^2 H(y).$$

These single sums will be faster to compute than double sums of Eq. (1).

The result is that hand gesture recognition or indeed body position recognition can be accomplished in milliseconds as opposed to several seconds.

In summary, a system is provided for rapidly recognizing hand gestures for the control of computer graphics, in which image moment calculations are utilized to determine an overall equivalent rectangle corresponding to hand position, orientation and approximate shape, with shape in one embodiment correlating to the length and width of the hand. In a further embodiment, a hole generated through the utilization of the touching of the forefinger with the thumb provides a special trigger gesture recognized through the corresponding hole in the binary representation of the hand. In a further embodiment, image moments are utilized to determine the center of mass of an image for controlling or directing onscreen images.

BRIEF DESCRIPTION OF THE DRAWING

These and other features of the Subject Invention will be better understood taken in conjunction with the Detailed Description in conjunction with the Drawing of which.

DETAILED DESCRIPTION

Figure 1:
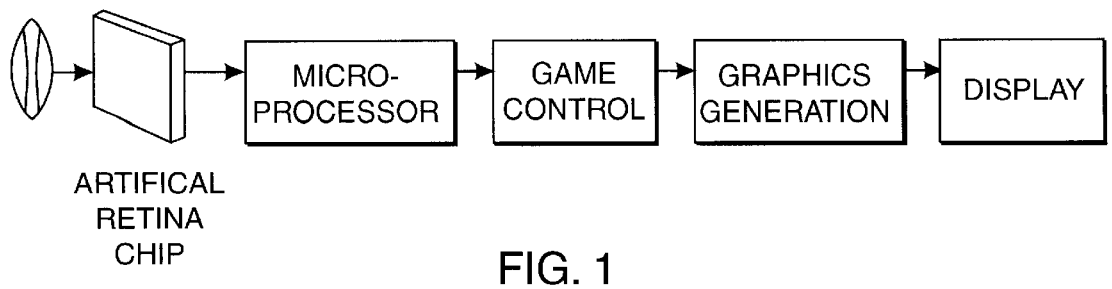
FIG. 1 is a block diagram of an artificial retina chip embodiment of the subject invention in which hand gestures are detected and decoded for game control.

Referring now to FIG. 1, in one embodiment, hand gesture recognition includes a system for scanning an area including a camera having a lens 10, an artificial retina chip 12, and a microprocessor 14 which is utilized to process the images to provide for the aforementioned image moment detection and control signals which are in turn applied to a game control unit 16 for driving a graphics generation unit 18 that provides the appropriate graphics on display 20.

As mentioned hereinbefore, it is the purpose of the subject invention to rapidly determine characteristics of a hand or other object in the field of view of lens 10 so as to be able to provide for the requisite game control, or in fact, any type of computer control display.

Figure 2:
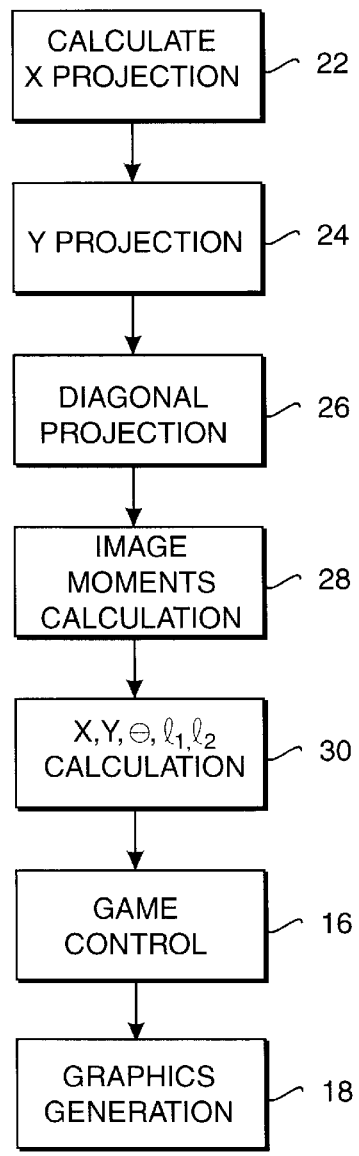
FIG. 2 is a flow chart illustrating the process of detecting hand gestures and providing game control signals for graphics generation.

More particularly, and referring now to FIG. 2, that which is the output of microprocessor 14 is the position; orientation and dimensions of the equivalent rectangle. In order to provide for this output, as can be seen at 22, in one embodiment, artificial retina chip 12 calculates the x projection. The y projection of the image is calculated at 24. These two calculations can either be done separately or in the illustrated embodiment performed by processors carried by the artificial retina chip.

While these two projections are necessary for the calculation of image moments, microprocessor 14 is utilized to calculate the diagonal projection as illustrated at 26 so as to complete an image moment calculation at 28 in accordance with Equations 6 through 9. After having calculated image moments, the rectangle corresponding to these image moments is calculated at 30 such that the resulting rectangle, analyzed as to orientation, position, length and width, provides requisite signals for game control unit 16 to be able to drive the appropriate graphics generation unit 18 so as to provide the requisite on-screen display. It will be appreciated that the calculation of the rectangle as illustrated at 30 is accomplished by Equations 2–5.

What is therefore accomplished through the utilization of an artificial retina chip is a rapid means of calculating image moments through precalculation of x and y projections by the artificial retina chip, followed by a calculation of the diagonal projection in the microprocessor. It will be appreciated that the calculation of the diagonal projection is accomplished in accordance with Equation 8.

It will be appreciated that what is meant by an x projection and a y projection is merely the sum of all of the image intensities in the x direction and the y direction respectively. For instance, for the x projection, one merely adds up all of the pixels in every column, yielding one sum for every column. The same is done for every row such that with its orthogonal representation, the sums of image intensities may be utilized in the derivation of the corresponding rectangle. It will be appreciated that the sums along each of the orthogonal axes, plus the diagonal axis is used by Equation 9 to calculate the image moments.

Referring now to FIGS. 3A–3E, the resulting rectangles for the corresponding images are shown. For instance, in FIG. 3A, the image as shown at 40 is a side view of a hand at a given orientation as illustrated by a center line 42. It will be appreciated that the resulting rectangle 44 is oriented along the same center line, but has a width 46 corresponding to the width of the hand, and a length 48 corresponding to the length of the hand.

Figures 3A, 3B, 3C, 3D, 3E:
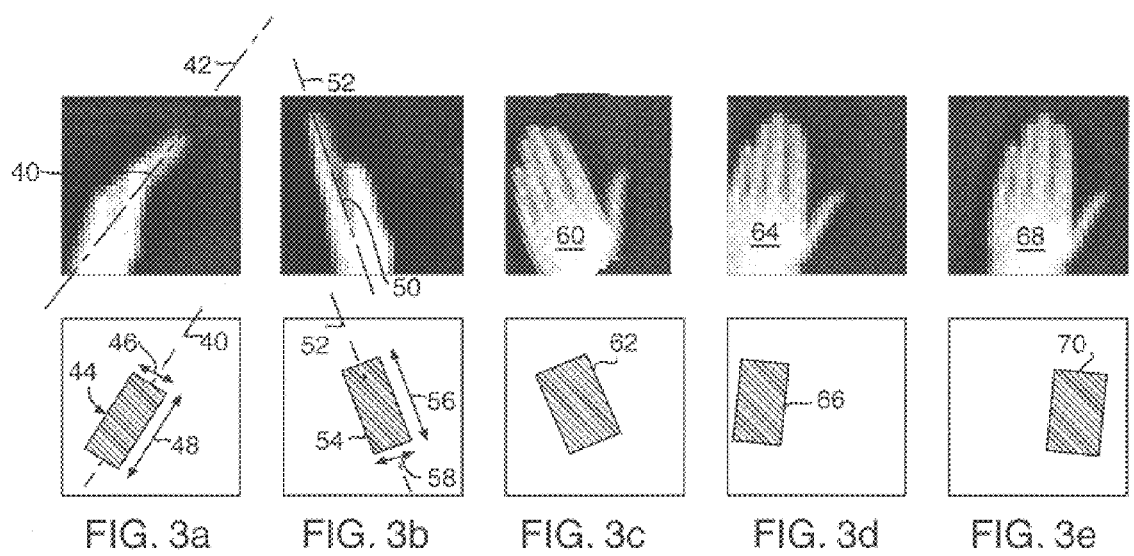
FIGS. 3A–3E are photographs of the digitized pictures of selected hand gestures and rectangles corresponding to the gestures.

As can be seen, while images in themselves are rather complicated in nature, they can be characterized in a simple way through the rough size and shape of a corresponding rectangle. As can be seen in FIG. 3B, a side view of hand 50, having a center line 52 is characterized by rectangle 54, having center line 52, a length 56 and width 58. The image of a flat hand illustrated at FIG. 3C at 60, is characterized by a corresponding rectangle at 62 whereas a thumbing gesture, as illustrated by image 64, is characterized by a corresponding rectangle 66. Referring to FIG. 3E, the image of FIG. 3D is shifted to the right as illustrated 68, with a corresponding change in the position and orientation of the corresponding rectangle 70 being depicted.

Figure 4A:
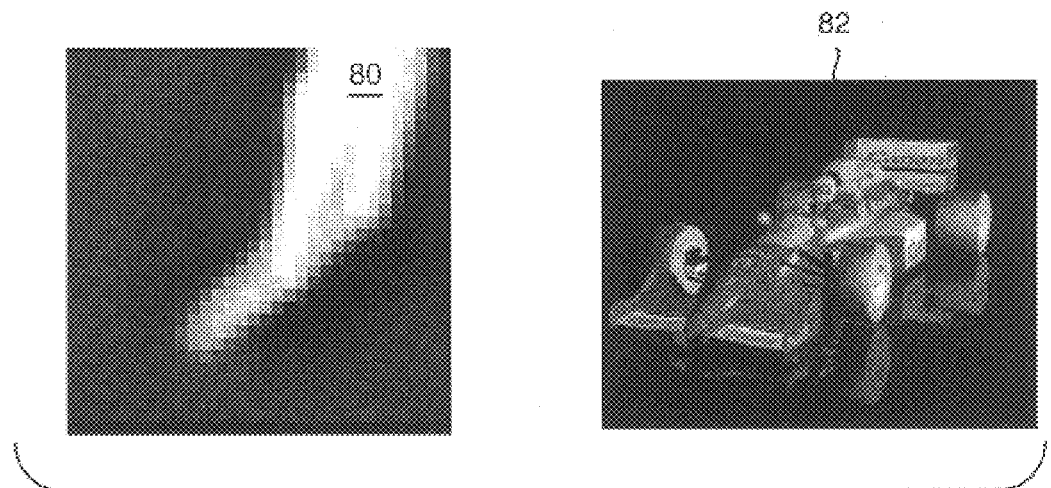
FIGS. 4A, 4B, and 4C are respective pictures of the digital image of selected hand gestures and the control of an onscreen graphical object, in this case a car, with the orientation of the car controlled by the orientation of the hand and the speed of the car controlled by the width of the hand.
Figure 4B:
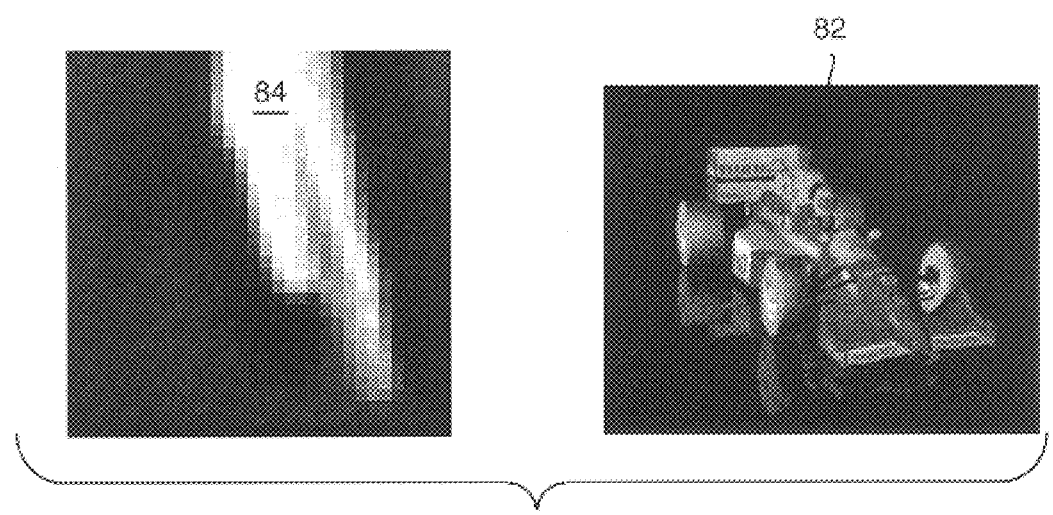
Figure 4C:
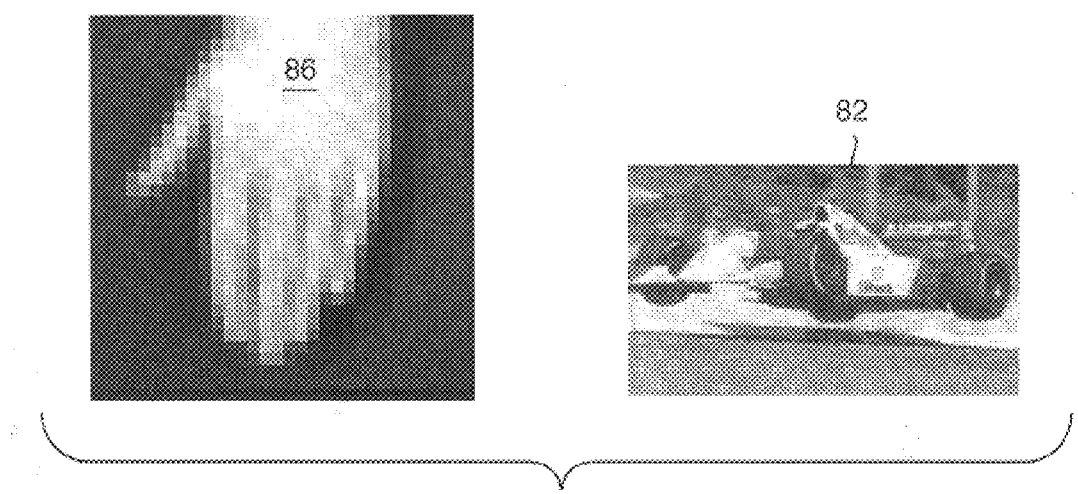

Having described a relatively simple way of rapidly detecting hand gestures, it will be appreciated, as illustrated in FIGS. 4A, 4B, and 4C, that different hand gestures can be utilized to create different positions and motions of an on-screen image. For instance, the downwardly projecting hand 80 causes the car 82 to be oriented in a direction corresponding to hand 80, whereas hand position 84 causes car 82 to move in the direction indicated by the hand. However, a flat hand 86 causes car 82 to speed up in accordance with the width of the hand. What will be appreciated is not only can the direction of on-screen images be changed in accordance with hand gesture control, other characteristics of the image such as its velocity can also be changed through hand gesture detection.

Figure 5:
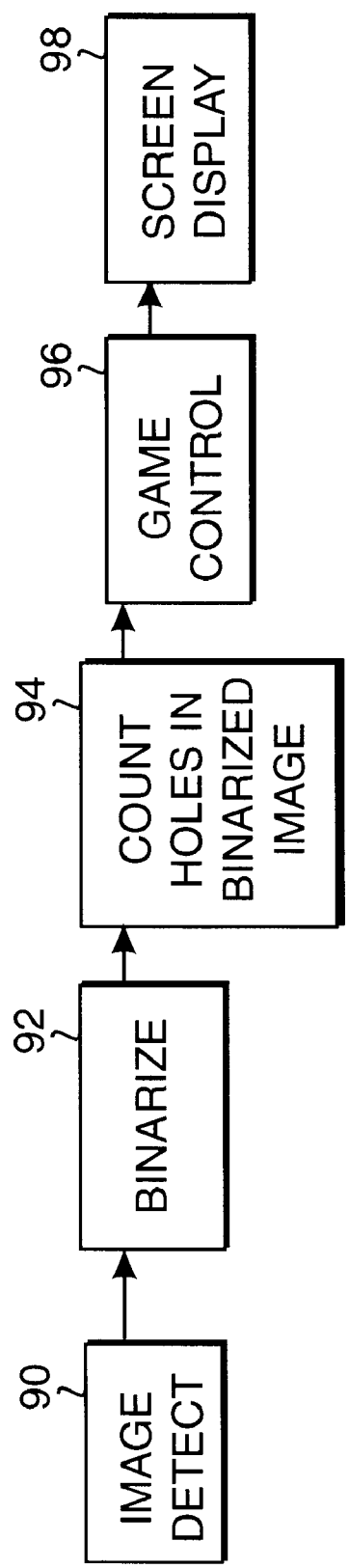
FIG. 5 is a block diagram illustrating the detection of a special trigger gesture in the form of a hole for game control.
Figure 6:
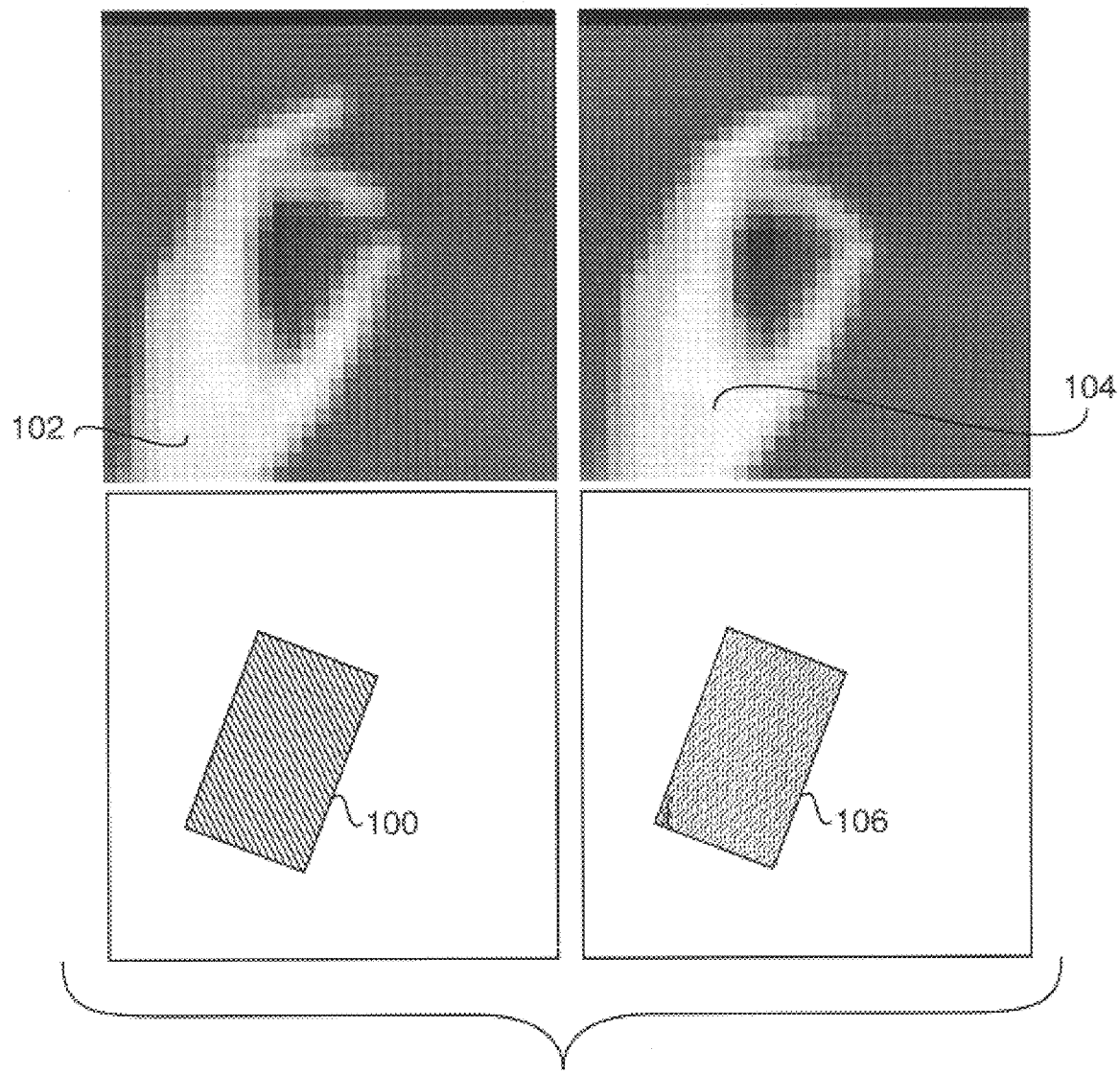
FIG. 6 is a series of photographs of the digital image of a hand generating the special hole trigger gesture, including the corresponding rectangle, with the detection of the trigger gesture indicated by a change in the fill pattern of the rectangle.

Referring to FIG. 5, as part of hand gesture recognition in accordance with the subject invention, it is possible to detect a unique trigger gesture, which is then utilized to enter into a programming sequence or to provide some other computer control regime. In this case, an image is detected at 90, is binarized at 92, with holes in the binarized image being counted at 94 by a method such as described in [1] such that for game control, the number of holes is utilized via a control unit 96 to control screen display 98. The holes in this case are those generated through the touching of thumb with the index finger to form a circle. This is a highly recognizable image. In one embodiment, the trigger gesture can be used to control the shading of a particular rectangle. For instance, as illustrated in FIG. 6, with the thumb and the forefinger not touching, the equivalent rectangle 100 is portrayed as being opaque. Rather, when the trigger gesture is completed by the touching of the thumb with the forefinger as illustrated at 104, the resulting rectangle 106 may be shaded or colored differently. The difference in shading of the rectangles indicates the detection of this easily recognized trigger gesture.

Figure 7:
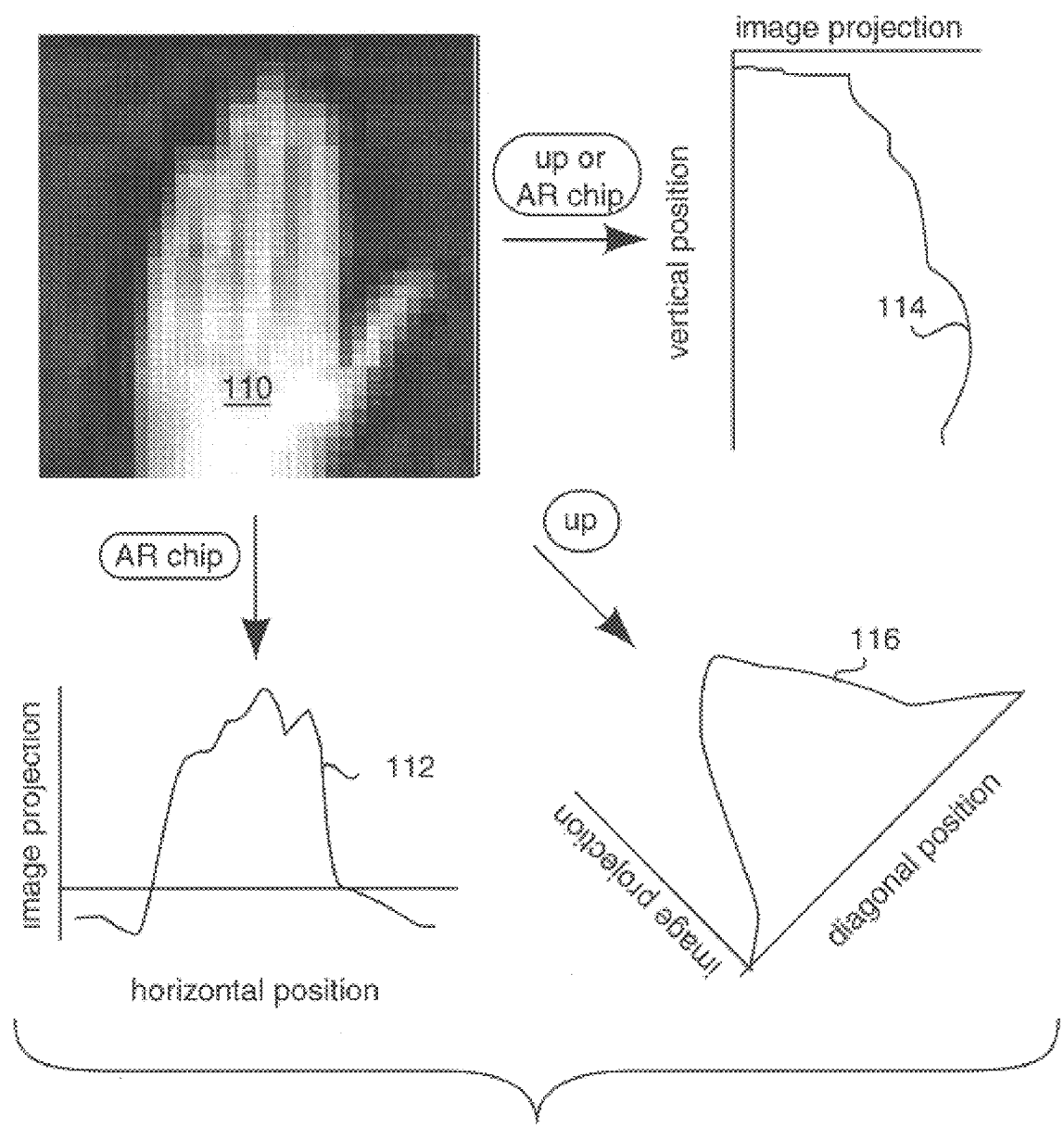
FIG. 7 is a diagrammatic representation of the image projections for a digital image of a hand, indicating by the circled text whether that projection can be calculated by the artificial retina chip (AR) or the microprocessor (uP); and, FIGS. 8A–8E are a series of pictures and diagrams indicating the image of a human being as detected by an artificial retina chip, its corresponding rectangle, and the corresponding action that an onscreen image of the individual's foot is to represent upon detection of a particular characteristic of the detected image, namely, "center of mass" location.

Referring now to FIG. 7, given an image at 110 of a hand, the horizontal image projection, the vertical image projection, and the diagonal image projection are as illustrated respectively by curves 112, 114, and 116. The processing in order to generate these curves is, as mentioned before, in the artificial retina chip for both the horizontal and vertical projections, with the processing being in the microprocessor for the diagonal projection.

Figure 8A:
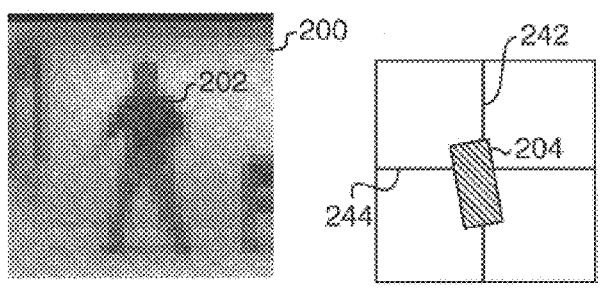
Figure 8A:
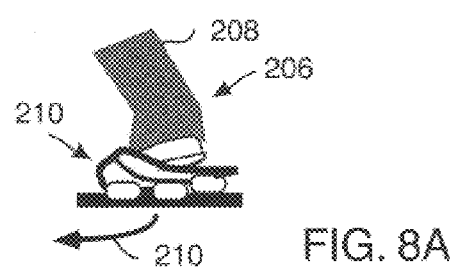

As mentioned hereinbefore, and referring now to FIGS. 8A–8E, it is possible for the subject system to recognize images other than hand. What will be seen from FIGS. 8A–8E is that a camera including lens 10 and artificial retina chip 12, is viewing a scene 200 in which an individual posed so as to present different aspects of the individual's body as shown by image 202. In a skate boarding situation, the individual shifts his weight to his right on a board in accordance with his body position as illustrated in FIG. 8A. The corresponding position of the individual is illustrated by rectangle 204. As illustrated to the right of this rectangle is a side view of the individual's leg 208 on skateboard 210, with the skateboard moving to the left (the individual's right) as illustrated by arrow 211.

Figure 8B:
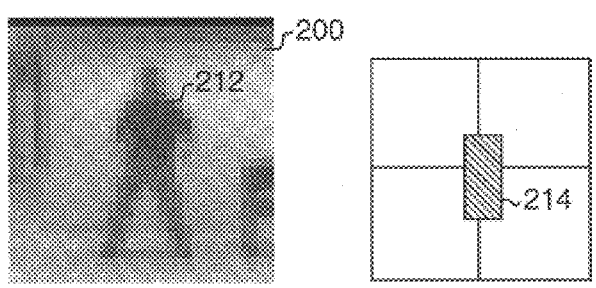
Figure 8B:
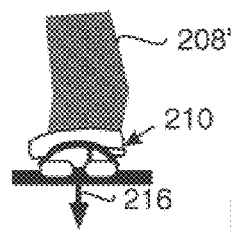

Alternatively, as illustrated in FIG. 8B by the individual's position in image 212, the corresponding rectangle 214 indicates that the individual is standing straight up on the skateboard, with the individual's leg 208 as illustrated, such that the board moves straight in the direction 216.

As illustrated by image 220, the individual seeks to have his skateboard moved to his left by leaning to the left. This is indicated by the corresponding rectangle 222, in which the leg 208, as illustrated in FIG. 8C, leans to the individual's left (on-screen right) with the skateboard going on-screen right as illustrated at 224.

As illustrated by image 230, it is oftentimes desirable to hop the skateboard by jumping vertically. This is indicated the corresponding rectangle 232, which causes the on-screen image of the skateboard, along with the individual here illustrated at 240, to execute a jumping maneuver.

Figure 8C:
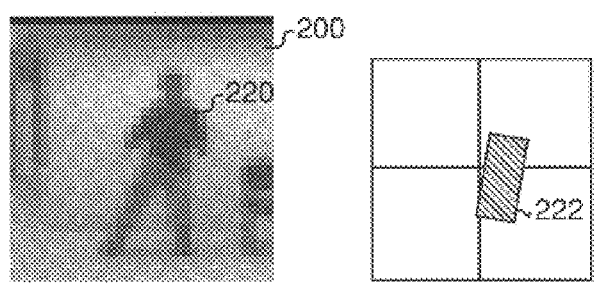
Figure 8C:
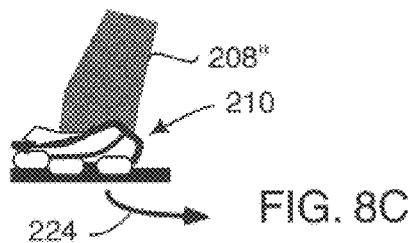
Figure 8D:
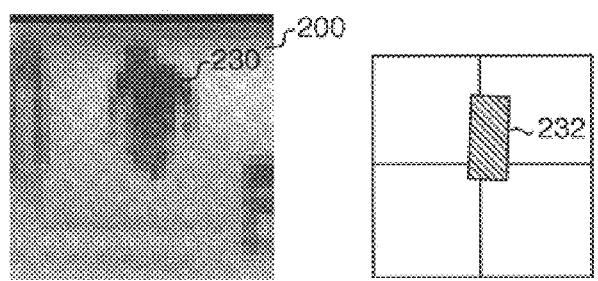
Figure 8D:
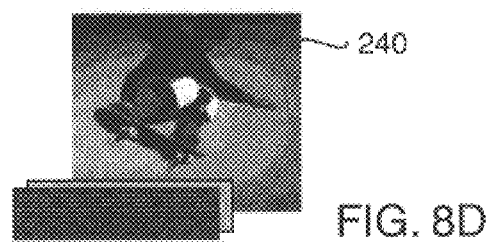
Figure 8E:
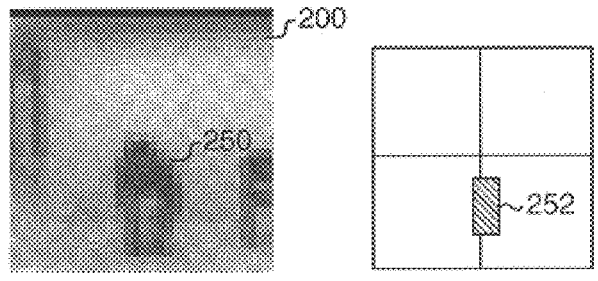
Figure 8E:
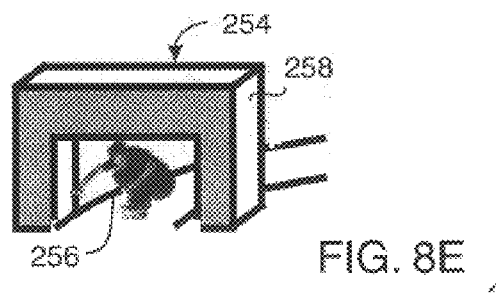

It will be appreciated that in FIGS. 8A, 8B, and 8C the position of the rectangle, $x_c$ and $y_c$ of equation 2, the so-called "center of mass" of the rectangle, is within a given distance from the center of cross hairs 242 and 244. However, when this center of mass rises vertically as illustrated by rectangle 232 outside a predetermined threshold distance established by the system, the subject system recognizes this position of the rectangle as being one indicating a jump. Thus, when the center of mass of rectangle 232 exceeds a predetermined vertical threshold distance from the cross hairs, the jump sequence is executed on-screen.

As can be seen by image 250, the individual is in a crouch position. This crouch position is reflected by the center of mass of rectangle 252 being below the intersection of the cross hairs by an amount which exceeds a predetermined threshold. This being the case, the image portrayed on-screen is that as illustrated at 254 to be a skateboarding individual 256 dipping down under a bridge-like structure 258.

What will appreciated is that the so-called "center of mass" of a rectangle, can be determined by Equation 2. This center of mass is then utilized to determine the motion of the on-screen image or, in fact, which on-screen image will be presented.

By center of mass of an image is meant the position in the image that would be the center of mass of an object which had a local mass density proportional to the image intensity at each pixel. The program for generating image moments and on-screen image control is now presented.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

I claim:

1. A system for rapidly recognizing non-regular objects in space for the control of computer graphics, comprising:
    means for scanning an area at which said object is expected to exist and for generating an electronic image in the form of a pixel representation of said object;
    means for detecting and calculating image moments from pixel intensities of pixels in said pixel representation;
    means for determining, based upon the calculated image moments, an overall rectangle equivalent to the object and having a position, orientation, length and width corresponding to object position, orientation, length and width; and,
    means for identifying parameters of said rectangle and generating a corresponding control signal.

2. A system for rapidly recognizing hand gestures for the control computer graphics, comprising:
    means for scanning an area at which a hand is expected to exist and for generating an electronic image in the form of a pixel representation of said hand;
    means for calculating image moments from pixel intensities of pixels in said pixel representation;
    means for determining, based upon the calculated image moments, an overall rectangle equivalent to the hand and having a position, orientation, length and width corresponding to a position, orientation, length and width of the hand; and,
    means for correlating said rectangle with a predetermined hand gesture and for providing a signal representing the result of said correlation.

3. The system of claim 2 wherein the correlating means responds to at least one of the position, the orientation, the length and the width of the rectangle exceeding a predetermined threshold by generating the control signal to control said computer graphics in a predetermined manner.

4. The system of claim 2, wherein said size corresponds to the width of the hand making said hand gesture.

5. The system of claim 2, wherein said correlating means responds to the existence of a hole within a region of said pixels generated through touching of a finger and a thumb of said hand by providing a predetermined signal upon correlating the corresponding rectangle to that hand gesture.

6. The system of claim 5 further comprising means for determining that the hole exist by counting a number of holes in said pixel representation.

7. A system for rapidly recognizing a non-regular image, comprising:
    means for generating a representation of said image;
    means for detecting and calculating image moments from pixel intensities of pixels in said pixel representation;
    means for determining, based on the calculated image moments, an overall geometric structure equivalent to the image and having length, width and height characteristics corresponding to parameters of said image; and,
    means for correlating said structure with a predetermined structure and for providing a signal representing the result of said correlating.

8. The system of claim 7 wherein the correlating means responds to at least one of the length, the width and the height characteristics of the structure exceeding a predetermined threshold by providing the signal to control computer graphics in a particular manner.

9. The system of claim 7, wherein said image is that of a hand, wherein said pixel generating means includes means for generating an electronic binary pixel image corresponding to said hand; and further comprising;
    means for determining a change in image topology corresponding to the exact time a portion of said image is in the form of a completed circle corresponding to that time at which a hole generated through touching of a finger of with a thumb of the hand is completed; and
    means for providing a predetermined signal upon detection of said completed circle, whereby said completed circle can be used as a staccato button-like-push to effectuate a hand generated on/off control action.

10. The system of claim 9 wherein said predetermined signal is a trigger signal.

11. The system of claim 10, wherein said trigger signal is generated in response to the detection of a hole within a region of said generated pixels.

12. The system of claim 11, wherein said hole is detected by counting the number of holes in said binary pixel image.

13. A method of controlling a digital representation, comprising the steps of:

imaging an object to generate object images;

determining a movement of the object based upon at least one of an orientation and a position of a first geometric configuration having a contour different than a contour of the object and corresponding to image intensities of a first of the object images and at least one of an orientation and a position of a second geometric configuration having a contour different than a contour of the object and corresponding to image intensities of a second of the object images; and controlling a digital representation based upon the determined movement.

14. The method of claim 13, further comprising the steps of:

computing a first spatially weighted average intensity of the generated first image in its entirety;

computing a second spatially weighted average intensity of the generated second image in its entirety;

generating the first geometric configuration based upon the computed first spatially weighted average; and generating the second geometric configuration based upon the computed second spatially weighted average.

15. The method of claim 13, wherein:

the imaged object is a hand;

the geometric configuration is a rectangle; and the movement corresponds to a gesture.

16. The method of claim 15, wherein:

the gesture is a circle formed with a thumb and a finger of the hand; and the digital representation is controlled such that an action is triggered responsive to the thumb contacting the finger to form the circle.

17. The method of claim 13, further comprising the steps of:

computing a first spatially weighted average intensity of the generated first image;

computing a second spatially weighted average intensity of the generated second image;

generating the first geometric configuration based upon the computed first spatially weighted average intensity, wherein the center of mass of the object in the first image corresponds to the center of the first geometric configuration; and generating the second geometric configuration based upon the computed second spatially weighted average intensity, wherein the center of mass of the object in the second image corresponds to the center of the second geometric configuration;

wherein the orientation and the position of the second geometric configuration is determined based on a difference in a location of the center of the first geometric configuration and a location of the center of the second geometric configuration.

18. The method of claim 13, further comprising the steps of:

computing first summations respectively summing intensities of the generated first image in an x direction, in a y direction and in a diagonal direction;

computing second summations respectively summing intensities of the generated second image in the x direction, in the y direction and in the diagonal direction;

generating the first geometric configuration based upon the computed first summations; and generating the second geometric configuration based upon the computed second summations.

19. The method of claim 13, further comprising the steps of:

determining another movement of the object in a third of the object images based upon a distance between (i) a third geometric configuration having a contour different than a contour of the object and corresponding to the object in the third image and (ii) a fixed reference; and controlling the digital representation based upon the determined other movement.

20. The method of claim 19, wherein:

the distance is a vertical distance and exceeds a threshold; and the digital representation is controlled to perform a jump sequence based upon the determined other movement.

21. A system for controlling a digital representation, comprising:

an imager configured to generate image intensity data representing an object in an orientation; and at least one processor configured (i) to process the generated image intensity data to generate a geometric configuration, corresponding to the generated image intensity data, representing the object, and having a contour different than a contour of the represented object and an orientation corresponding to the orientation of the represented object, and (ii) to generate signals to control a digital representation based upon the orientation of the geometric configuration.

22. The system of claim 21, wherein the object is a body part.

23. The system of claim 21, wherein the geometric configuration is a rectangle.

24. The system of claim 21, wherein:

the represented object has a position;

the generated geometric configuration has a position corresponding to the position of the represented object; and the at least one processor is further configured to generate the signals to control the digital representation based upon the position of the geometric configuration.

25. The system of claim 21, wherein:

the orientation of the represented object is a first object orientation, the image data is first image data, and the geometric configuration is a first geometric configuration and the orientation of the first geometric configuration is a first orientation;

the imager is further configured to generate second image data representing the object in a second object orientation; and the at least one processor is further configured (i) to process the generated second image data to generate a second geometric configuration representing the object, and having a contour different than the contour of the object represented by the second image data and a second orientation corresponding to the second object orientation of the object, (ii) to determine a movement of the object from the second object orientation to the first object orientation based upon the first orientation, and (iii) to generate the signals to control the digital representation in accordance with the determined movement.

26. The system of claim 21, wherein said at least one processor is further configured to:
- compute a spatially weighted average intensity of the generated image data in its entirety; and
- generate the geometric configuration based upon the computed spatially weighted average.

27. The system of claim 21, wherein:

the object is a hand;

the image data represents a circle formed with a thumb and a finger of the hand; and the at least one processor is configured to generate the control signal to thereby trigger an action responsive to the thumb contacting the finger to form the circle.

28. The system of claim 21, wherein the object has a center of mass and the geometric configuration has a center point; and the center point of the geometric configuration corresponds to the center of mass of the object.

29. The system of claim 21, wherein:

the at least one processor is further configured to compute summations respectively summing intensities of the generated image data in an x direction, in a y direction and in a diagonal direction and to generate the geometric configuration based upon the computed summations.

30. The system of claim 21, wherein:

the represented object has a position;

the generated geometric configuration has a position corresponding to the position of the represented object;

the at least one processor is further configured to determine a distance between the position of the geometric configuration and a fixed reference, and to generate the signals to control the digital representation based upon the determined distance.

31. The system of claim 30, wherein:

the distance is a vertical distance and exceeds a threshold; and the digital representation is controlled to perform a jump sequence.

32. The system of claim 21, wherein:

the at least one processor is two processors; and the imager and one of the processors form an artificial retina.

* * * * *